(12) United States Patent
Keshet

(10) Patent No.: US 7,289,247 B2
(45) Date of Patent: Oct. 30, 2007

(54) METHOD AND SYSTEM FOR UTILIZING A SELF-SIMILARITY TECHNIQUE TO PROCESS AN IMAGE

(75) Inventor: Renato Keshet, Haifa (IL)

(73) Assignee: Hewlett-Packard Development Company, L.P., Houston, TX (US)

(*) Notice: Subject to any disclaimer, the term of this patent is extended or adjusted under 35 U.S.C. 154(b) by 914 days.

(21) Appl. No.: 10/679,884

(22) Filed: Oct. 6, 2003

(65) Prior Publication Data

US 2005/0073704 A1 Apr. 7, 2005

(51) Int. Cl.
G06K 15/00 (2006.01)
G06K 1/00 (2006.01)

(52) U.S. Cl. .................. 358/3.26; 358/1.9

(58) Field of Classification Search ............ 358/1.9, 358/2.1, 1.2, 1.18, 3.26, 3.27, 538, 3.23
See application file for complete search history.

(56) References Cited

U.S. PATENT DOCUMENTS

| | | |
|---|---|---|
| 6,577,408 B1 | 6/2003 | Rusnack et al. |
| 6,914,628 B1 * | 7/2005 | Kuwata et al. ............ 348/272 |
| 2002/0027599 A1 * | 3/2002 | Yamazaki |
| 2003/0048242 A1 * | 3/2003 | Jeong et al. |
| 2003/0234960 A1 * | 12/2003 | Kaltenbach et al. |

* cited by examiner

Primary Examiner—Douglas Q. Tran (57) ABSTRACT

A method and system for utilizing a self-similarity technique to process an image is disclosed. In accordance with embodiments of the present invention, an image is processed utilizing an image processing technique based on a self-similarity assumption. Through the use of the method and apparatus in accordance with the present invention, imperfections that are present in a degraded image can be compensated for in a simple, fast and non-iterative fashion thereby resulting in a higher quality image. A first aspect of the present invention is a method for utilizing a self-similarity technique to process an image. The method includes obtaining a corrupted image, altering the corrupted image to obtain an altered image, determining a plurality of parameters of a parametric mapping operator for mapping the altered image into the corrupted image and utilizing the plurality of parameters to map the corrupted image into an output image.

24 Claims, 5 Drawing Sheets

METHOD AND SYSTEM FOR UTILIZING A SELF-SIMILARITY TECHNIQUE TO PROCESS AN IMAGE

FIELD OF THE INVENTION

The present invention relates generally to image scanners and more particularly to a method and system for utilizing a self-similarity technique to process an image.

BACKGROUND OF THE INVENTION

Image processors (scanners, copiers, fax machines, etc) convert a visible image on a document or photograph, or an image in a transparent medium, into an electronic form suitable for copying, storing or processing by a computer. An image processor may be a separate device or may be a part of a copier, part of a facsimile machine, or part of a multipurpose device. In general, image processors use an optical lens system or optical waveguide system to focus an image onto an array of photo sensors. In some processors, a Gradient Index Lens Array (GILA) is employed. A GILA is a row of lenses that goes across the width of the page being processed. One of the issues with the utilization of a GILA is that the farther out of focus the image moves the more the image has a tendency to be seen by multiple lenses. This causes the creation of aberrations known as "echoes" or the "echo effect". Because the array of lenses is in a row, the echo effect is one-dimensional in nature, occurring only in the horizontal direction. As a result of the echo effect, a "de-echoing" process is desirable in order to minimize the presence of these aberrations or echoes.

De-echoing belongs to the class of de-convolution tasks. In this case the convolution that has to be undone is assumed to have a train of pulses as a kernel. These pulses usually have varying intensities and they occur a fixed distance d from neighboring pulses. Since the out-of-focus distance is known, the convolution kernel is known.

Figure 1A:
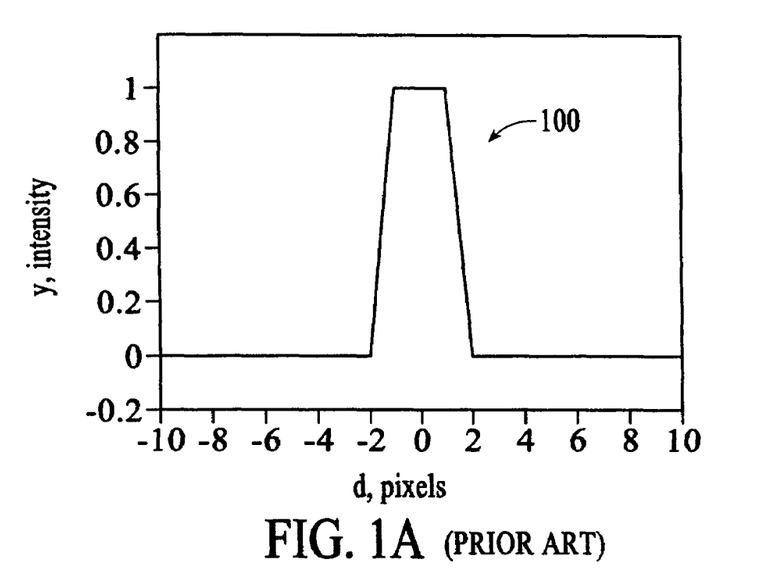
FIG. 1A shows a 1 dimensional input signal.
Figure 1B:
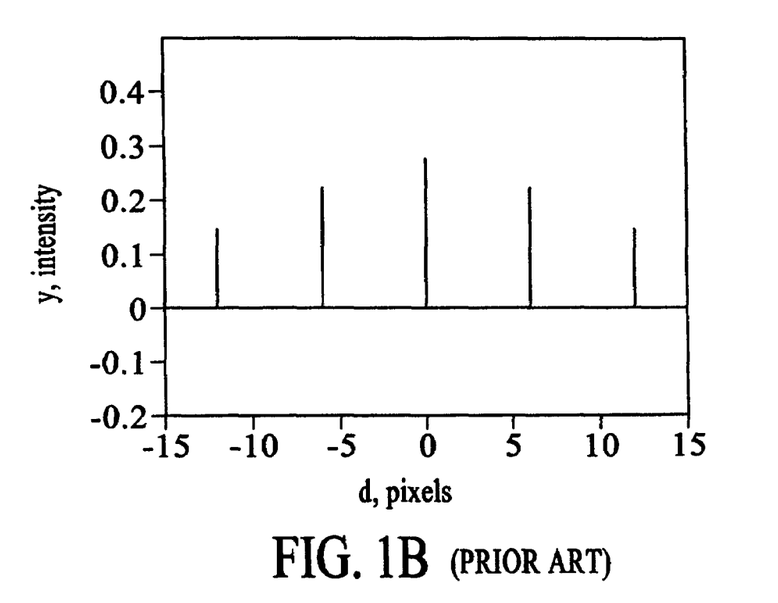
FIG. 1B shows a train of pulses with variable amplitudes.
Figure 1C:
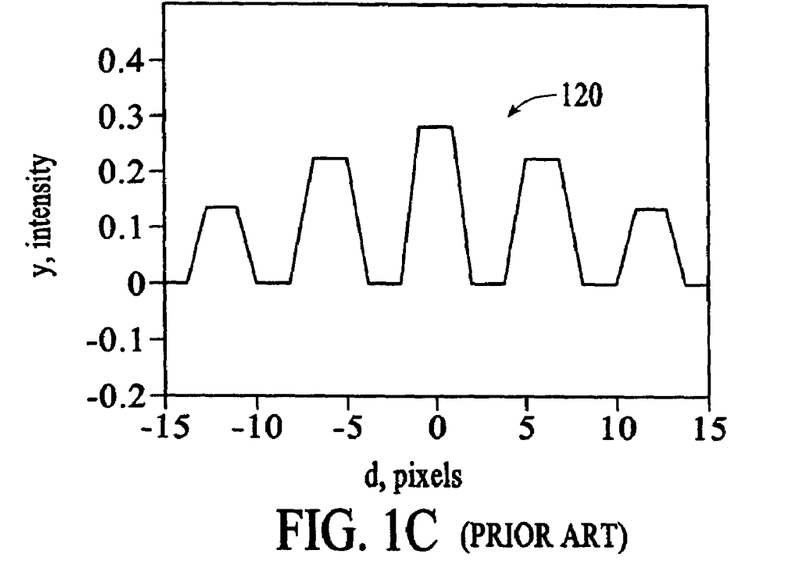
FIG. 1C shows a train of echoes which are the result of convolving the input signal with the train of pulses.

For a better understanding, please refer to FIG. 1A-FIG. 1D. In each Figure, the vertical axis represents an intensity value y and the horizontal axis represents a number of pixels d. FIG. 1A shows a 1 dimensional input signal (image) 100. FIG. 1B shows a train of pulses 110 with variable amplitudes. In this particular example the distance between pulses is d=6. FIG. 1C shows a train of echoes 120 which are the result of convolving the input signal 100 with the train of pulses 110.

Figure 1D:
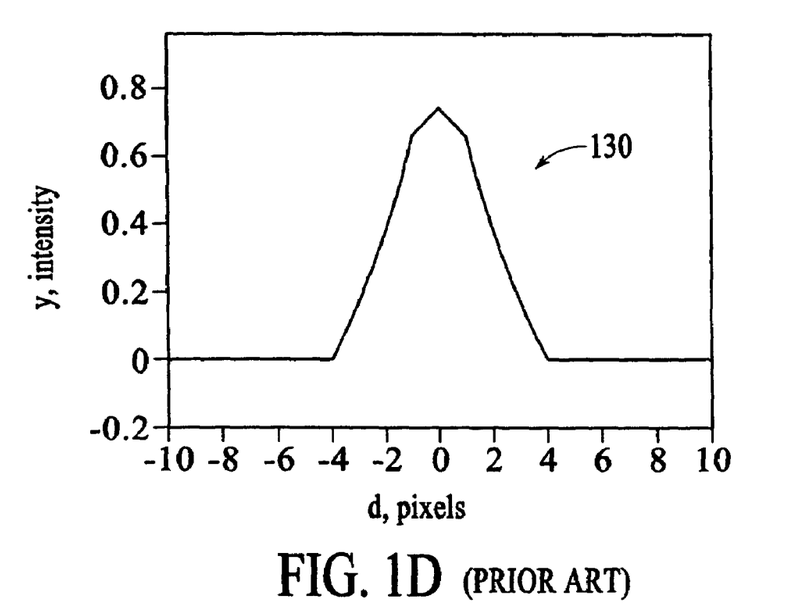
FIG. 1D shows a resulting signal when the input signal is convolved with a train of pulses with d=1.

It should also be noted that when an input signal is convolved with a train of pulses where d=1, the resulting signal is not referred to as a train of echoes but rather a blurred version of the input signal (image). Likewise, the "train of pulses" is not referred to as such, but rather as a blurring kernel. FIG. 1D shows a resulting signal 130 when the input signal is convolved with a train of pulses with d=1. In either case (de-echoing or de-blurring), the convolution kernel is known and de-convolution is needed in order to minimize the presence of these aberrations.

A conventional solution for the de-convolution of a known kernel is to divide the Fourier coefficients of the measured signal by the Fourier coefficient of the kernel and apply an inverse Fourier transform. However, this solution is unstable in the presence of noise. Other techniques involve the implementation of iterative algorithms that require substantial computation complexity.

In general, what is needed is a method and system that addresses the above-referenced problems associated with the de-convolution of an input image. Additionally, the method and system should be simple, inexpensive and capable of being easily adapted to existing technology. The present invention addresses these needs.

SUMMARY OF THE INVENTION

A method and system for utilizing a self-similarity technique to process an image is disclosed. In accordance with embodiments of the present invention, a processing algorithm is generated based on a self-similarity assumption. Through the use of the method and apparatus in accordance with the present invention, imperfections that are present in a degraded image can be compensated for in a simple, fast and non-iterative fashion thereby resulting in a higher quality image.

A first aspect of the present invention is a method for utilizing a self-similarity technique to process an image. The method includes obtaining a corrupted image, altering the corrupted image to obtain an altered image, determining a plurality of parameters of a parametric mapping operator for mapping the altered image into the corrupted image and utilizing the plurality of parameters to map the corrupted image into an output image.

A second aspect of the invention is a system for utilizing a self-similarity technique to process an image. The system includes means for obtaining a corrupted image, means for altering the corrupted image to obtain an altered image, means for determining a plurality of parameters of a parametric mapping operator for mapping the altered image into the corrupted image and means for utilizing the plurality of parameters to map the corrupted image into an output image.

A third aspect of the present invention is a scanning apparatus. The scanning apparatus includes a processor, an operating system coupled to the processor and a scanning module coupled to the operating system wherein the scanning module comprises logic for instructing the processor to perform the steps of obtaining a corrupted image, altering the corrupted image to obtain an altered image, determining a plurality of parameters of a parametric mapping operator for mapping the altered image into the corrupted image and utilizing the plurality of parameters to map the corrupted image into an output image.

Other aspects and advantages of the present invention will become apparent from the following detailed description, taken in conjunction with the accompanying drawings, illustrating by way of example the principles of the invention.

DETAILED DESCRIPTION

The present invention relates to a method and system for processing an image. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiment shown but is to be accorded the widest scope consistent with the principles and features described herein.

A method and system for processing an image is disclosed. In accordance with embodiments of the present invention, a processing algorithm is generated based on a self-similarity assumption. Through the use of the method and apparatus in accordance with the present invention, imperfections that are present in a degraded image can be compensated for in a simple, fast and non-iterative fashion thereby resulting in a higher quality image. For the purposes of this patent application, an image can be textual, graphical, digital, analog or a variety of other types while remaining within the spirit and scope of the present invention.

Figure 2:
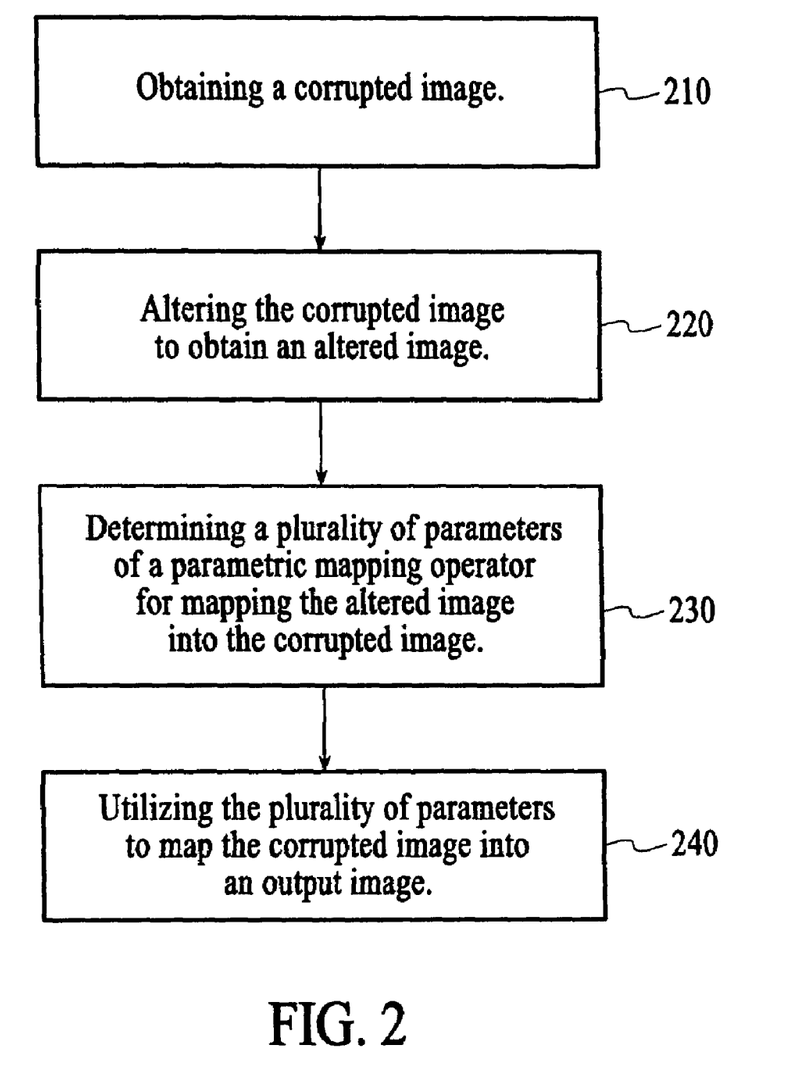
FIG. 2 is a high-level flow chart of a method in accordance with an embodiment of the present invention.

For a better understanding of the present invention please refer to FIG. 2. FIG. 2 is a high-level flow chart of a method in accordance with an embodiment of the present invention. A first step 210 includes obtaining a corrupted image. In varying embodiments, the corrupted image is an echoed or blurred image. A second step 220 includes altering the corrupted image to obtain an altered image. In varying embodiments, altering the corrupted image includes producing an echoed or blurred version of the corrupted image. For example, if the corrupted image includes echoes, altering the corrupted image involves echoing the echoed image. Similarly, if the corrupted image is a blurred image, altering the corrupted image involves blurring the blurred image.

A third step 230 involves determining a plurality of parameters of a parametric mapping operator for mapping the altered image into the corrupted image. A final step 240 involves utilizing the plurality of parameters to map the corrupted image into an output image.

The above-described embodiment of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention.

This computer readable media may comprise, for example, RAM contained within the system. Alternatively, the instructions may be contained in another computer readable media such as a magnetic data storage diskette and directly or indirectly accessed by the computer system. Whether contained in the computer system or elsewhere, the instructions may be stored on a variety of machine readable storage media, such as a DASD storage (for example, a conventional "hard drive" or a RAID array), magnetic tape, electronic read-only memory, an optical storage device (for example, CD ROM, WORM, DVD, digital optical tape), or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

Figure 3:
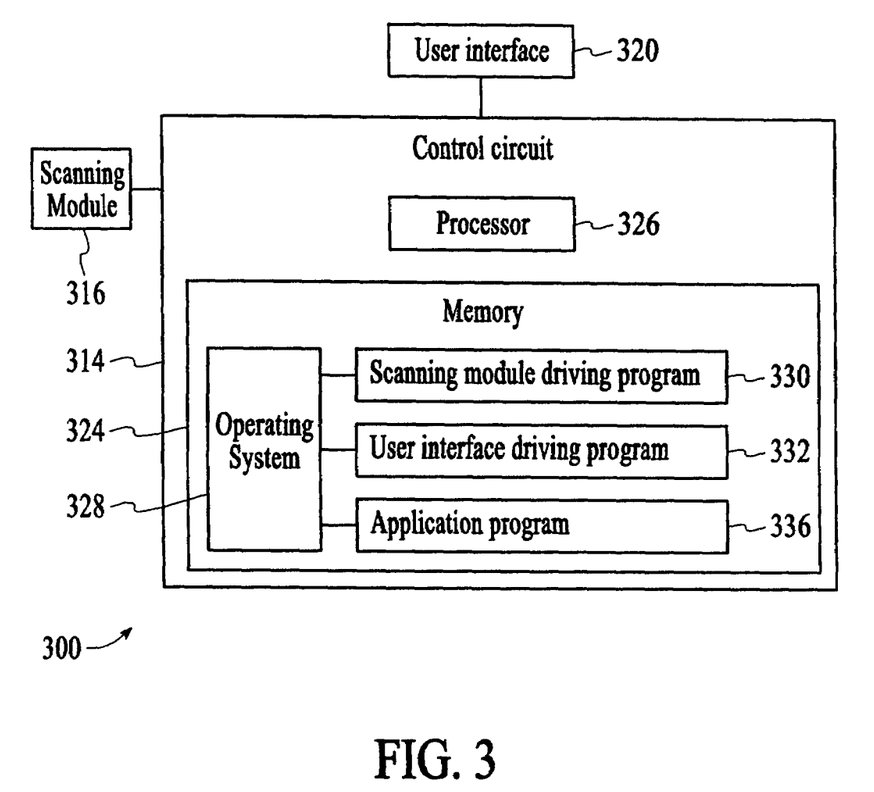
FIG. 3 shows a system for performing a method in accordance with an embodiment of the present invention.

FIG. 3 shows an example of a system 300 for performing a method in accordance with an embodiment of the present invention. In this particular embodiment, the system 300 is a scanner or scanning apparatus. The system 300 includes a control circuit 314 for controlling operations of the system 300 and a scanning module 316 connected to the control circuit 314 wherein the scanning module includes logic for performing the method in accordance with the present invention. The system 300 further includes a user interface 320 connected to the control circuit 314 wherein the user interface 320 includes a plurality of keys for inputting key signals.

The control circuit 314 includes a memory 324 for storing programs and data, and a processor 326 for executing the programs in the memory 324. The memory 324 includes an operating system 328 for controlling the operations of the processor 326, a scanning module driving program 330 executed under the operating system 328 for controlling the operations of the scanning module 316 and processing the document image signals generated by the scanning module 316, a user interface driving program 332 executed under the operating system 328 for controlling the operations of the user interface 320, and an application program 336 executed under the operating system 328 for setting the operation mode of the scanning module driving program 330 and the processing method of the image signals according to the key signals inputted by the user and transmitted by using the user interface driving program 332.

As previously mentioned, the present invention employs self-similarity techniques to process an image. Self-similarity involves the notion that natural images are self-similar or in other words there is a high correlation between different scaling levels of natural images.

This observation leads to the following paradigm for image scaling. In order to upscale an image, first downscale it i.e. in order to undo an image degradation, an initial step involves a further degradation of the image.

Although this paradigm is described in the context of image scaling, the paradigm can be extended to other image processing tasks as well. For example, if an image needs to be de-echoed, first echo the image; if an image needs to be de-blurred, first blur the image, etc. Next, find the parameters of a parametric mapping operator that brings the further echoed or blurred image as close as possible to the original echoed or blurred image. Finally, the same parameters are utilized to map the original echoed or blurred image into an output image.

Although the above-described embodiments of the present invention are disclosed in the context of a de-echoing or a de-blurring process, one of ordinary skill in the art will readily recognize that the process could be applied to a variety of different types of image processing tasks while remaining within the spirit and scope of the present invention.

The following is an illustration of some mathematical relationships that characterize a self-similarity approach in accordance with an embodiment of the present invention. In this illustration, a 1-dimensional measured signal g(x) is obtained by a linear translation-invariant degradation of an ideal signal f(x) by a kernel k(x) as shown in Eq. (1);

$$g(x)=f(x)*k(x) \qquad (1)$$

What is accordingly desired is a determination of an approximation, F(x), of the underlying signal f(x).

In a self-similarity approach, a first step towards determining F(x) is to further degrade the measured signal, g(x) by the same kernel k to obtain a filtered signal h(x) as shown in Eq. (2):

$$h(x)=g(x)*k(x) \qquad (2)$$

Next, a parametric mapping operator $M_{p1}$ is assumed and a set of parameters p that maps the filtered signal h to "a good" approximation G of the measured signal g is found as shown in Eq. (3):

$$G(x)=M_{p1}\{h(x)\} \qquad (3)$$

Finally, once p is determined, $M_{p1}$ is used to map the measured signal g to an approximation signal F of f as shown in Eq. (4):

$$F(x)=M_{p1}\{g(x)\}. \tag{4}$$

Although Eqs. 1-4 depict fundamental mathematical relationships involved in a self-similarity approach, an improved processing operation employs a parametric mapping operator, $M_{p2}$, similar to that used in fractal coding/scaling algorithms. Fractal scaling/coding algorithms implement mapping operators that are based on adaptive shifting. Consequently, the following parametric mapping operator, $M_{p2}$, is shown in Eq. (5):

$$M_{p2}\{u\}=u[x+p(x)], \tag{5}$$

The parameter p(x) can then determined from the relationship between h(x) and g(x), by minimizing the cost function $|g(x)-h(x+p(x))|$. In other words, for each value of x, the parameter p(x) is that value for which the function $|g(x)-h(x+p(x))|$ achieves its minimum.

The ideal signal approximation, F(x), can then be determined as follows:

$$F(x)=M_{p2}\{g\}=g[x+p(x)]. \tag{8}$$

This solution, however, does not have the desired effect of boosting the contrast of the image. An improved process is shown in Eq. 9 for a parametric mapping operator $M_{p3}$:

$$M_{p3}\{u\}=u(x)+u[x+p(x)]-(u*k)[x+p(x)], \tag{9}$$

where p(x) is determined as described above. The approximation signal is then given by:

$$F(x)=M_{p3}\{g\}=g(x)+g[x+p(x)]-h[x+p(x)]. \tag{10}$$

In an embodiment of the present invention, a discrete signal f(i) is employed, where i is an integer index. Here, for each value of i, the mapping parameter p(i) is equal to the integer $n \in N$, for which the cost function $|g(i)-h(i+n)|$ achieves its minimum.

In order to reduce computations, the search for optimal displacement n is limited to only three values: −d, 0 and d, where d is the distance between echoes. In order to compensate for the loss of quality caused by the limitation of the search range, fuzzy mapping can be implemented instead of Equation (10) whereby the approximation signal, F(x), can be determined as follows:

$$F(i) = g(i) + \lambda \sum_{n \in [-d,0,d]} \alpha_n [g(i+n) - h(i+n)], \tag{11}$$

where $\lambda$ is a strength parameter.

The parameters $\alpha_n$ are accordingly obtained as a function of the relative similarity between g(i) and h(i+n). More specifically, calculate the similarity values $s_n=|g(i)-h(i+n)|$ for all the three values of n, and the minimum of all three similarities $m=\min(s_{-d}, s_0, s_d)$. The relative similarity $r_n$, for each value of n, is given by $r_n=s_n-m$, which is always non-negative.

Now calculate $\alpha_n=\phi(r_n)$, where $\phi$ is a pre-determined function. In one embodiment, $\phi(x)$ is as follows:

$$\phi(x)=\min(1, T/(x+1)), \tag{12}$$

where T is a tunable parameter.

In general, the function $\phi$ returns high values for small input values, and vice-versa. Finally, the parameters $\alpha_n$ are obtained by normalizing the values $\alpha_n'$, i.e., $\alpha_n=\alpha_n'/(\alpha_d' + \alpha_0' + \alpha_d')$.

Figure 4:
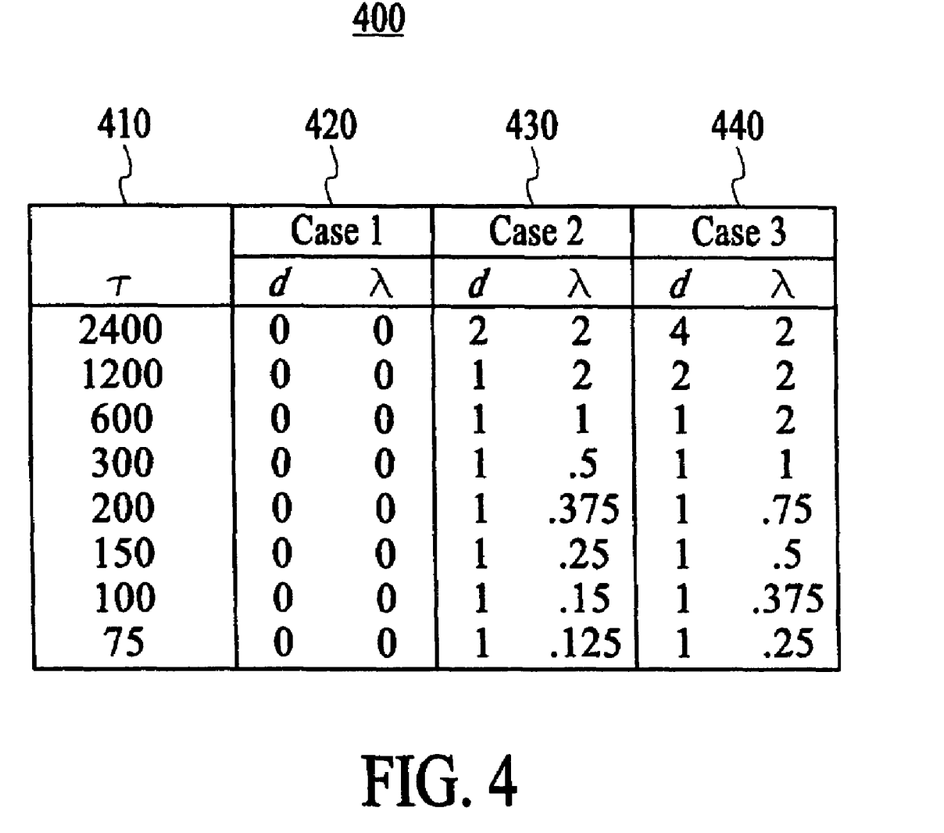
FIG. 4 shows a tuning table in accordance with an embodiment of the present invention.

The strength parameter $\lambda$ and the pulse distance d can be manually tuned for a fixed output resolution of the approximation signal. However, $\lambda$ and d should vary as a function of the output resolution as shown in FIG. 4. FIG. 4 shows a tuning table 400 in accordance with an embodiment of the present invention. The tuning table 400 includes a resolution column 410 and parameter columns 420-440. Resolution column 410 includes a variety of different resolution values and parameter columns 420-440 illustrate empirically obtained $\lambda$ and d parameter values.

For example, suppose $d=d_r=2^n$ (for some integer n) and $\lambda=\lambda_r$ at a given resolution r. If n>0, then at a resolution r/2, $\lambda$ is kept the same, whereas d is set to $d_r/2=2^{(n-1)}$. If, however, n=0 (i.e. $d_r=1$) then, at resolution r/2, d is kept equal to 1, whereas $\lambda$ is set to $\lambda/2$. This rule should be iterated for resolutions r/4, r/4, r/8 and so forth.

For instance, suppose for a certain scanning device, d=4 and $\lambda=2$ at the resolution of 2400 ppi (pixels per inch). Then, the values of d and $\lambda$ for other resolutions can be set as shown in parameter column 440.

Based on the above outlined mathematical relationships, a processing algorithm in accordance with an embodiment of the present invention can be characterized as follows:

Given a degraded 2D discrete image G(i,j), do the following for each line $g_j(i)$ of G(i,j):

1. Calculate a further degraded version of the line:

$$h_j(i)=(g_j*k)(i), \tag{13}$$

where k(i) represents the echoing kernel, and includes a pulse train with a distance d between the neighboring pulses. In an embodiment, intensities $k(-2d)=k(2d)=0.138$, $k(-d)=k(d)=0.222$, and $k(0)=0.28$. These intensities do not need to be fixed and could be updated for different image processing devices.

2. For each pixel i, calculate the similarity values:

$$s_{-d}=|g_j(i)-h_j(i-d)|, \tag{14}$$

$$s_0=|g_j(i)-h_j(i)|, \tag{15}$$

$$s_d=|g_j(i)-h_j(i+d)|, \tag{16}$$

and the associated minimum, $m=\min(s_{-d}, s_0, s_d)$. In an embodiment, the distance d between pulses is obtained, for example, from the image processing device manufacturer and could depend on a variety of factors related to the image processing device including but not limited to an out-of-focus distance, an acquisition resolution, an optical system characteristic, etc. For example, referring back to FIG. 4, FIG. 4 shows an example of a tuning table 400 where d is a function of the resolution r.

3. Use these values to calculate the non-normalized a mapping parameters as follows:

$$\alpha_d'=\min(1,T/S_{-d}-m+1)), \tag{17}$$

$$\alpha_0''=\min(1,T/S_0-m+1)), \tag{18}$$

$$\alpha_d'=\min(1,T/S_d-m+1)), \tag{19}$$

In an embodiment, a value of T=3 is utilized to obtain good results, however one of ordinary skill in the art will readily recognize that a variety of different values of T could be utilized while remaining within the spirit and scope of the present invention.

4. The normalized α mapping parameters are then given by:

$$\alpha_d = \alpha_d'/(\alpha_d' + \alpha_0' + \alpha_d') \quad (20)$$

$$\alpha_0 = \alpha_0'/(\alpha_d' + \alpha_0' + \alpha_d') \quad (21)$$

$$\alpha_d = \alpha_d'/(\alpha_d' + \alpha_0' + \alpha_d') \quad (22)$$

5. Calculate the output value $O(i,j)$ of the pixel utilizing the normalized mapping parameters:

$$O(i,j) = g_j(i) + \lambda\{\alpha_d[g_j(i-d) - h_j(i-d)] + \alpha_0[g_j(i) - h_j(i)] + \alpha_d[g_j(i+d) - h_j(i+d)]\}, \quad (23)$$

where $\lambda$ is the strength parameter. Accordingly, Eq. (23) has 5 parameters, two inputs, and one output. The two inputs are the signals g and h and the output is the image O. Among the 5 parameters, there are 2 global parameters [i.e., parameters that do not depend on the pixel position (i,j)], and 3 local parameters [parameters that are recalculated for each pixel (i,j)]. The global parameters are d and $\lambda$ and the local parameters are the α parametric mapping operator parameters.

In an embodiment, step 1 is performed for each line only once, by calculating the values of $h_j(i)$ for all possible values of i before proceeding to step 2. Steps 2 through 5 are then performed iteratively for each pixel i. In an alternate embodiment, steps 1-5 are performed iteratively for each value of i, where the calculation of $h_j$ in step 1 is done at each iteration for the pixels i−d, i, and i+d only.

Although the above-described implementation involves a two-dimensional image, each line is addressed separately. Therefore, the embodiment of the proposed process is one-dimensional in nature. One of ordinary skill will readily recognize that a two-dimensional extension of the process is fairly straightforward and within the spirit and scope of the present invention.

Additionally, the above-described image processing technique is implemented based on a monochromatic input signal. However, in dealing with a color image, a variety of different implementations can be employed. In a first implementation, the algorithm can be applied to each color plane separately. In a second implementation, the color image is transformed from the input Red Green Blue(RGB) space to a color space where one of the components is a luminance component (YIQ, YcbCr, Lab, etc.). The luminance channel is processed with the above-described technique and the result output RGB space is transformed. A final disclosed implementation, processes only the Green channel of the input signal with the above-described technique and computes the Red and Blue channels as follows:

$$F_R(i,j) = G_R(i,j) + D(i,j) \quad (24)$$

$$F_B(i,j) = G_B(i,j) + D(i,j) \quad (25)$$

where $F_R$, $F_G$, and $F_B$ are the red, green, and blue channels of the output image, respectively, $G_R$, $G_G$, and $G_B$ are the red, green and blue channels of the input image, respectively, and $$D(i,j) = F_G(i,j) - G_G(i,j). \quad (26)$$

A method and system for processing an image is disclosed. In accordance with embodiments of the present invention, an image is processed utilizing an image processing technique based on a self-similarity assumption. Through the use of the method and apparatus in accordance with the present invention, imperfections that are present in a degraded image can be compensated for in a simple, fast and non-iterative fashion thereby resulting in a higher quality image.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The invention claimed is:

1. A method for utilizing a self-similarity technique to process an image comprising:
   obtaining a corrupted image;
   altering the corrupted image to obtain an altered image;
   determining a plurality of parameters of a parametric mapping operator for mapping the altered image into the corrupted image; and
   utilizing the plurality of parameters to map the corrupted image into an output image.

2. The method of claim 1 wherein the process comprises a de-echoing process and the act of altering the corrupted image further comprises:
   creating echoes of the corrupted image.

3. The method of claim 1 wherein the process comprises a de-blurring process and the act of altering the corrupted image further comprises:
   creating a blur of the corrupted image.

4. The method of claim 2 wherein the act of creating echoes of the corrupted image further comprises:
   convolving the corrupted image with a plurality of pulses wherein each of the pulses are separated by a number of pixels.

5. The method of claim 4 wherein the number of pixels comprises only one pixel.

6. The method of claim 4 wherein the act of utilizing the plurality of parameters comprises:
   adding to each of the number of pixels a multiplication of a strength factor by a combination of values associated with a plurality of neighboring pixels.

7. The method of claim 6 wherein the strength factor is a fixed scalar.

8. The method of claim 6 wherein the strength factor depends on parameters used by an image acquisition device when obtaining the corrupted image wherein the parameters used by the image acquisition device comprise at least one of an out of focus distance, an acquisition resolution or an optical system characteristic.

9. The method of claim 6 wherein the act of determining a plurality of parameters of a parametric mapping operator comprises:
   calculating at least one similarity value for each of the neighboring pixels; and
   utilizing the at least one similarity value to produce at least one of the plurality of parameters.

10. The method of claim 4 wherein the number of pixels is obtained by at least one of an image acquisition device or an image acquisition device manufacturer.

11. The method of claim 4 wherein the number of pixels depends on parameters used by an image acquisition device when obtaining the corrupted image wherein the parameters used by the image acquisition device comprise at least one of an out of focus distance, an acquisition resolution or an optical system characteristic.

12. A system for utilizing a self-similarity technique to process an image comprising:
   means for obtaining a corrupted image;
   means for altering the corrupted image to obtain an altered image;
   means for determining a plurality of parameters of a parametric mapping operator for mapping the altered image into the corrupted image; and means for utilizing the plurality of parameters to map the corrupted image into an output image.

13. The system of claim 12 wherein the process comprises a de-echoing process and the means for altering the corrupted image further comprises:
means for creating echoes of the corrupted image.

14. The system of claim 13 wherein the means for creating echoes of the corrupted image further comprises:
means for convolving the corrupted image with a plurality of pulses wherein each of the pulses are separated by a number of pixels.

15. The system of claim 14 wherein the means for utilizing the plurality of parameters comprises:
means for adding to each of the number of pixels a multiplication of a strength factor by a combination of values associated with a plurality of neighboring pixels.

16. The system of claim 15 wherein the means for determining a plurality of parameters of a parametric mapping operator comprises:
means for calculating at least one similarity value for each of the neighboring pixels; and
means for utilizing the at least one similarity value to produce at least one of the plurality of parameters.

17. A scanning apparatus comprising:
a processor;
an operating system coupled to the processor; and
a scanning module coupled to the operating system wherein the scanning module comprises logic for instructing the processor to perform the steps of:
obtaining a corrupted image;
altering the corrupted image to obtain an altered image;
determining a plurality of parameters of a parametric mapping operator for mapping the altered image into the corrupted image; and
utilizing the plurality of parameters to map the corrupted image into an output image.

18. The apparatus of claim 17 wherein the process comprises a de-echoing process and the logic for altering the corrupted image further comprises logic for:
creating echoes of the corrupted image.

19. The apparatus of claim 18 wherein the logic for creating echoes of the corrupted image further comprises logic for:
convolving the corrupted image with a plurality of pulses wherein each of the pulses are separated by a number of pixels.

20. The apparatus of claim 19 wherein the logic for utilizing the plurality of parameters comprises logic for:
adding to each of the number of pixels a multiplication of a strength factor by a combination of values associated with a plurality of neighboring pixels.

21. A computer program product for utilizing a self-similarity technique to process an image, the computer program product comprising a computer usable medium having computer readable program means for causing a computer to perform the steps of:
obtaining a corrupted image;
altering the corrupted image to obtain an altered image;
determining a plurality of parameters of a parametric mapping operator for mapping the altered image into the corrupted image; and
utilizing the plurality of parameters to map the corrupted image into an output image.

22. The computer program product of claim 21 wherein the process comprises a de-echoing process and the step of altering the corrupted image further comprises:
creating echoes of the corrupted image.

23. The computer program product of claim 22 wherein the step of creating echoes of the corrupted image further comprises:
convolving the corrupted image with a plurality of pulses wherein each of the pulses are separated by a number of pixels.

24. The computer program product of claim 23 wherein the step of utilizing the plurality of parameters comprises:
adding to each of the number of pixels a multiplication of a strength factor by a combination of values associated with a plurality of neighboring pixels.

* * * * *

UNITED STATES PATENT AND TRADEMARK OFFICE
CERTIFICATE OF CORRECTION

PATENT NO. : 7,289,247 B2
APPLICATION NO. : 10/679884
DATED : October 30, 2007
INVENTOR(S) : Renato Keshet

It is certified that error appears in the above-identified patent and that said Letters Patent is hereby corrected as shown below:

In column 6, line 41, equation 15, delete "$s_0|=g_j(i)-h_j(i)|$," and insert -- $s_0 = /g_j(i)-h_j(i)/$, --, therefor.

In column 6, line 59, equation 18, delete "$\alpha_o'''$" and insert -- $\alpha_0'$ --, therefor.

Signed and Sealed this

Fourth Day of November, 2008

JON W. DUDAS
*Director of the United States Patent and Trademark Office*